June 27, 1939.  C. H. ZIMMERMAN  2,163,655
SLOTTED AIRPLANE WING TIP
Filed April 2, 1938

INVENTOR.
CHARLES H. ZIMMERMAN
BY
Ransom H. Davis
ATTORNEY.

Patented June 27, 1939

2,163,655

UNITED STATES PATENT OFFICE 2,163,655

SLOTTED AIRPLANE WING TIP

Charles H. Zimmerman, West Hartford, Conn.

Application April 2, 1938, Serial No. 199,637

1 Claim. (Cl. 244—40)

(Granted under the act of March 3, 1883, as amended April 30, 1928; 370 O. G. 757)

This invention relates to airplane slots so placed in aircraft wings that the direction of the flow outward along the upper surfaces is in a manner to augment the vortex motion at the outer wing tips.

A further object of this invention is to provide wing slots in the wings of an aircraft, which wing slots are at an angle to the direction of the aircraft and more or less parallel to the outer edges or tips of the aircraft wing near which they are located so that the difference in pressure between the upper and lower surfaces of the airfoil wing causes a flow of air through the slots. Difference in pressure between the upper and lower surfaces of the airfoil causes a flow of air through the slots. The momentum of this air is directed outward and backward along the upper surface and adds energy to the vortex motion which is a natural and necessary part of the 3-dimensional streamline flow about the airfoil. Energy added in this manner preserves streamline flow to much higher angles of attack than would be possible with the unslotted airfoil and thus increases the range of glide angle possible with an airfoil of low aspect ratio or the lateral stability characteristics of an airfoil of conventional plan form.

With the foregoing and other objects in view, the invention consists in the construction, combination and arrangement of parts hereinafter described and illustrated in the drawing, in which, Fig. 1 is a top plan view of an aircraft of conventional wing area whose width is a large multiple of its depth, to which this invention has been applied.

Figure 5:
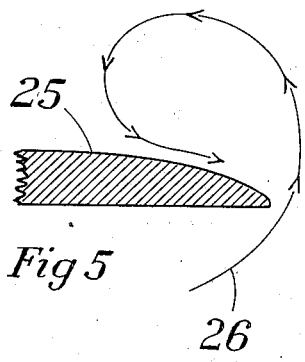
Fig. 5 is a similar sectional view of a wing tip without this invention, showing the air currents therearound.

There are shown at 10 and 10' two forms of aircraft, to the wings 12 and 12' of which this invention has been applied. In wing 12, where the width of the wing is a large multiple of the depth, this invention includes a long slot 14 and a short slot 15 parallel thereto, each of which slots 14 and 15 are set at an angle of about 45 degrees to the direction of travel of the aircraft 10. On aircraft 10' the width of the wing 12' is a small multiple of the depth thereof, and in this case the invention includes a long slot 14' and a short slot 15' parallel thereto and at an angle to the direction of travel of the aircraft.

In each case the slots are more or less parallel to a tangent to the outer rear wing tip of the aircraft wings 12 and 12'.

Figure 3:
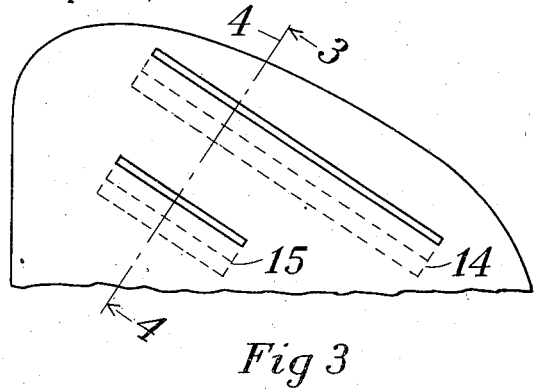
Fig. 3 is an enlarged fragmentary view of a wing tip.
Figure 4:
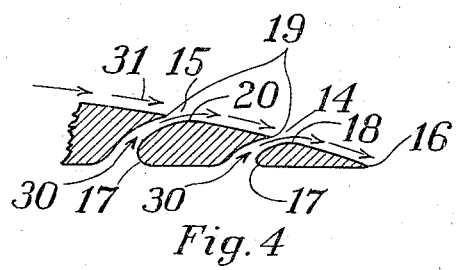
Fig. 4 is a sectional view on line 4—4 of Fig. 3, showing the air currents therearound.
Figure 1:
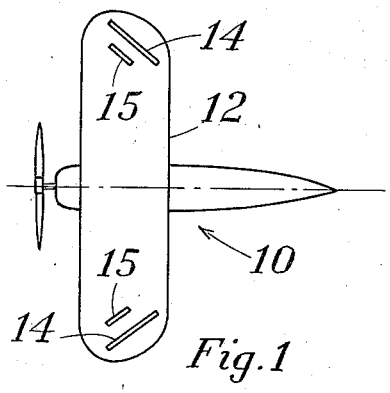
Figure 2:
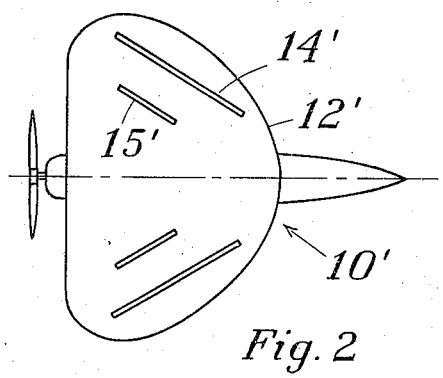
Fig. 2 is a similar view of an aircraft having a wing whose width is a very small multiple of its depth with this invention applied thereto.

In Fig. 3 an enlarged fragmentary section of the wing tip 16 shows that the slots 14 and 15 extend upwardly and rearwardly therethrough in smooth, airfoil shape, as brought out in Fig. 4, the entrance 17 of the slots being substantially forward of the exit 18. It will be further observed that the forward lip 19 of the exit 18 has a fairly acute angle, while the rearward lip 20 merges smoothly with the tip of the wing.

When the conventional type of aircraft wing tip shown is traveling through the air, a vortex motion in air is caused, following the path of the arrows 26. The air slipping from under the edge of the tip and traveling in a vortex motion causes the tip to be depressed rather than supported by the air, causing great unstability. With this invention, however, the currents of air 30 are caused to travel through the slots 14 and 15 instead of being allowed to escape under the wing tip edge 16. The air currents traveling through the slots 14 and 15 are deflected in the path of the arrows 31 instead of the path 26 of Fig. 5, thus eliminating the down pressure and providing greatly increased stability and lift for the wing tips.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

Means for increasing the stability and lift of aircraft wing tips comprising wing slot means extending upwardly and rearwardly in a smooth curve through the wing adjacent the tip, said slot means comprising a long slot adjacent the wing tip edge and parallel to a tangent thereto, and a short slot forwardly of and parallel to said longer slot, said slots being at an acute angle to the direction of travel of the aircraft.

CHARLES H. ZIMMERMAN.